(No Model.)
J. M. FRAZER.
FISH TRAP.
No. 270,411. Patented Jan. 9, 1883.
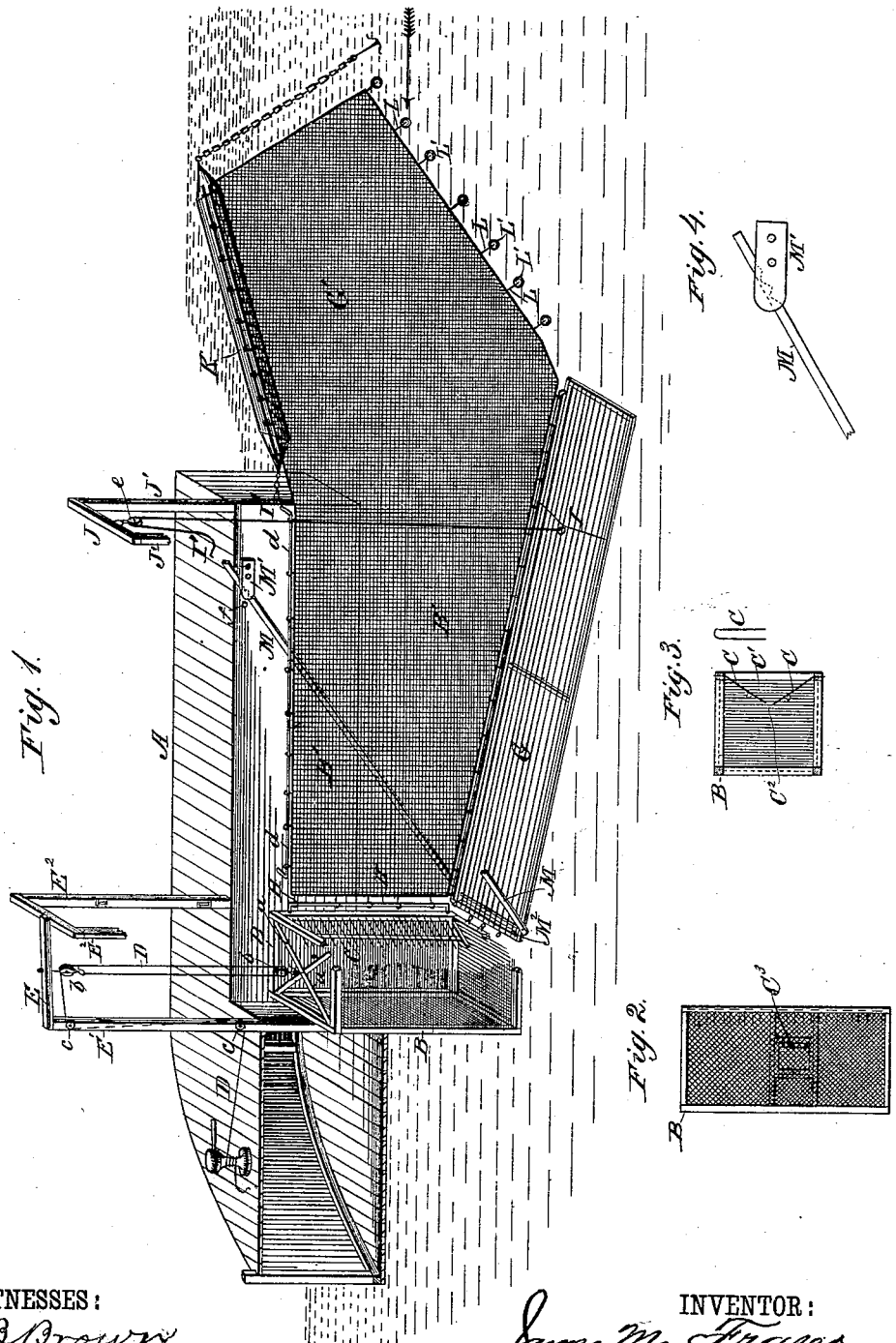
WITNESSES:
INVENTOR:
James M. Frazer
BY
ATTORNEYS.

UNITED STATES PATENT OFFICE.

JAMES M. FRAZER, OF PORTLAND, OREGON.

FISH-TRAP.

SPECIFICATION forming part of Letters Patent No. 270,411, dated January 9, 1883.

Application filed September 11, 1882. (No model.)

*To all whom it may concern:*

Be it known that I, JAMES M. FRAZER, of Portland, in the county of Multnomah and State of Oregon, have invented a new and useful Improvement in Fish-Traps; and I do hereby declare that the following is a full, clear, and exact description of the same, reference being had to the accompanying drawings, forming part of this specification.

This invention relates to improvements in fish-traps, and has for its object to readily secure migrating fish; and it consists in the employment of a trap or cage having inclined or inward deflected converging rows of staple-shaped bars affixed to an upright frame or other suitable support thereof, the said cage or trap being adapted to move or be elevated or lowered by suitable means, combined with a lead-net having a conductor or mouth, and capable of being held in proper position as against the action of the current, and of being raised and lowered, as may be desired, substantially as hereinafter more fully set forth.

In the accompanying drawings, Figure 1 is a perspective view of my improved fish-trap with a portion thereof removed, and as applied for use in connection with a boat or ponton, taken partly in section and partly in perspective; and Figs. 2, 3, and 4 are detail views.

In carrying out my invention I employ in connection with a ponton or boat, A, a cage, B, and a lead-net, B', with means for vertically adjusting and anchoring the same, the ponton or boat being adapted to receive said cage and lead-net, and permit them to be lowered into the water below its bottom. The cage B, which constitutes the trap proper, is preferably rectangular in form, and is arranged to stand in an upright position and to move in the opening in the ponton. It may be constructed with reticulated sides and back and with a slatted bottom, and provided at its top with crossing beams or pieces $a$, while at its front it has inward inclined or deflected rows of converging staple-shaped bars C. The staple-shaped bars C are also arranged in a horizontal position, and passed, those of one row through one corner-post or upright of the cage B at their looped or connected-together ends, while their other portions are passed through a second upright of the cage, with their free ends extended beyond the said upright to a point a short distance forward and at one side of a vertical plane passing centrally through the cage. The opposite row of staple-shaped bars C are similarly arranged and secured in position, whereby a chute, C', having a narrow longitudinal opening, $C^2$, is provided to direct or cause the fish to pass into the cage or trap. The cage B is suspended and adapted to be vertically adjusted or raised and lowered by means of a rope or chain, D, passed through tackle or pulley blocks $b\ b$, connected to a crossbeam, E, by means of a hook and ring, and to the top crossing bars of the cage or trap in a similar manner. The beam E is secured at one end, it may be, upon an upright, E', fastened to the ponton or boat at the front side of the opening therein, and upon a cross beam or bar secured to uprights $E^2$, also fastened to the ponton at the sides of said opening. The rope or chain D is further passed over a pulley, $c$, supported upon the upright E', thence under a pulley, $c'$, at the lower end of the upright E', and finally connected to a windlass or other suitable winding apparatus stationed upon the ponton or boat.

The lead-net B is hung in the opening in the ponton or boat, with its upper edges connected to rods $d$, secured to the sides of said opening, while its bottom may be made of slats G, suitably secured in a bottom frame, to rods on which it is connected itself at its lower side edges. The bottom G of the net is connected to the bottom of the trap B, at one end, preferably by eyebolts and hooks, while the ends of the sides of the net are connected by rings to bail-shaped rods H, fastened to the corner-posts of the front frame of the trap B by their horizontal portions or arms. The lead-net B' is connected near its outer end to a bail, I, to which is attached a rope or cord, I', passed up over a pulley, $e$, hung upon a beam, J, secured to uprights J', fastened to the sides of the opening in the ponton or boat, near its stern. This arrangement permits the raising and lowering of the lead-net simultaneously with the vertical adjustment of the trap in letting the same down into the water to entrap or impound the fish and removing the same from the water to enable the fish to be taken from the trap B, which is done through a door, $C^3$, in one side thereof. The lead-net B' is extended beyond the stern of the ponton, as at G', said extension being connected to booms K, suitably anchored and hung at the stern of the ponton or boat, on the sides of the opening therein, by swinging which inward that end of the net is closed as the same is elevated to prevent the escape of the fish. The extension G' of the net is also weighted or anchored to resist the action of the current, preferably by means of iron balls and chains or ropes L L', with the ropes or chains connected to the said extension.

M is an oblique brace, of which there are two, with its upper end passed through the mortise or slot of a bar, M', fastened to the sides of the opening in the ponton, near its stern, while its lower end reaches down to the bottom of the net B' and near its inner end, where the two braces are connected together underneath the said bottom by means of a cross-rod, M², supporting the bottom thereat. The upper end of the brace is confined in place by teeth in one end of the mortise or slot of the bar M', engaging teeth or notches in the brace, and a stud or projection, f, secured in the side of the opening in the ponton in such relation to said brace as to hold its teeth or notches in engagement with those of the bar M'.

This apparatus is readily operated and easily managed, and is capable of manipulation or adapted to permit fishing either in fresh or salt water and to a depth of a single fathom or less, or to a depth of as many as twenty fathoms or more.

Having thus described my invention, what I claim as new is—

1. In a fish-trap, the combination, with a ponton or boat, A, having an opening therein, of the cage B and a rope or chain passed over elevated pulleys and under a pulley disposed to permit the convenient manipulation of the rope or chain to move the cage up and down within said ponton or boat, said cage having at its front side rows of inward-projecting converging bars, providing a narrow entrance-opening thereto, substantially as and for the purpose set forth.

2. In a fish-trap, the combination, with the ponton or boat, A, having an opening therein, of the cage B, having the rows of inward-projecting converging bars, forming a chute having a narrow opening, the lead-net B', connected to the cage B and to the rods secured to the sides of the opening of the ponton, and having an extension, G', hung upon booms K, connected to the stern of the ponton, and means for raising and lowering the cage and net, substantially as and for the purpose set forth.

3. In a fish-trap, the combination, with the open ponton or boat A and the lead-net B', of the oblique brace M, connected underneath the bottom of the net by a rod, M², to a similar opposite brace, and the mortised, notched, or toothed support M' and stud or projection f, substantially as and for the purpose set forth.

The above specification of my invention signed by me in the presence of two subscribing witnesses.

JAMES M. FRAZER.

Witnesses:
 A. H. TANNER,
 T. J. SMITH.